(12) United States Patent
Champagne

(10) Patent No.: US 11,738,722 B2
(45) Date of Patent: Aug. 29, 2023

(54) MIRROR CLEANING DEVICE

(71) Applicant: Harvey Champagne, Farmington, NM (US)

(72) Inventor: Harvey Champagne, Farmington, NM (US)

( * ) Notice: Subject to any disclaimer, the term of this patent is extended or adjusted under 35 U.S.C. 154(b) by 0 days.

(21) Appl. No.: 17/232,743

(22) Filed: Apr. 16, 2021

(65) Prior Publication Data

US 2021/0347337 A1    Nov. 11, 2021

Related U.S. Application Data

(60) Provisional application No. 63/020,113, filed on May 5, 2020.

(51) Int. Cl.
*B60S 3/04* (2006.01)
*G02B 27/00* (2006.01)
*B25G 3/36* (2006.01)

(52) U.S. Cl.
CPC ............... *B60S 3/045* (2013.01); *B25G 3/36* (2013.01); *G02B 27/0006* (2013.01)

(58) Field of Classification Search
CPC .... B60S 3/04; B60S 3/045; A47L 1/06; A47L 13/02; A47L 13/11; A47L 13/12; A46B 5/005; A46B 15/0081; A46B 5/0095; B25G 3/36; G02B 27/006; G02B 27/0006
USPC .............................. 15/111, 144.4, 143.1, 145
See application file for complete search history.

(56) References Cited

U.S. PATENT DOCUMENTS

| | | | | |
|---|---|---|---|---|
| 2,772,435 A * | 12/1956 | Louk | ...................... | B60S 3/045 15/245 |
| 10,052,009 B1 * | 8/2018 | Morad | .................. | A47L 13/256 |
| 2013/0097793 A1 * | 4/2013 | Henningsen | ....... | A46B 15/0081 15/144.4 |
| 2014/0259499 A1 * | 9/2014 | Post | .......................... | A47L 1/15 15/231 |
| 2015/0298659 A1 * | 10/2015 | Varner | .................... | A47L 13/12 15/105 |

FOREIGN PATENT DOCUMENTS

CA              3095789 A1 * 12/2019   ........... A46B 5/0045

* cited by examiner

*Primary Examiner* — Katina N. Henson
(74) *Attorney, Agent, or Firm* — Brennan, Manna & Diamond, LLC

(57) ABSTRACT

A mirror cleaning device configured to effectively and properly clean side-view mirrors or rear-view mirrors having a curved profile on a vehicle. The mirror cleaning device comprises a head connected to an ergonomic handle. The head comprises a connecting bar and a cleaning blade retaining rail. The head is removably attachable to the ergonomic handle via a mechanical fastener. The mirror cleaning device further comprises a squeegee blade. The squeegee blade fits in a groove in the cleaning blade retaining rail. The squeegee blade is configured to move and adapt to the curvature of almost any mirror or glass surface to effectively remove any dirt, dust, water, or other contaminates from the surface of the mirror.

6 Claims, 4 Drawing Sheets

MIRROR CLEANING DEVICE

CROSS-REFERENCE TO RELATED APPLICATION

The present application claims priority to, and the benefit of, U.S. Provisional Application No. 63/020,113, which was filed on May 5, 2020 and is incorporated herein by reference in its entirety.

FIELD OF THE INVENTION

The present invention relates generally to a device for cleaning a mirror. More specifically, the present invention relates to a hand tool designed to clean side rear view mirrors on a vehicle with ease. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, motor vehicles are used by people for travelling from one place to another. Usually, motor vehicles such as cars, or the like are equipped with windshield wipers for cleaning and wiping dirty windshield surfaces. The windshield wiper is used to remove rain, snow, ice, water, or other debris from a vehicle's front window in order to provide a clear view of what's ahead of the vehicle operator. A wiper generally consists of a metal arm. One end pivots and the other end has a long rubber blade attached to it. The arm is powered by a motor and the blade is swung back and forth over the glass. The rubber blade pushes water and debris from the window surface making the window clean and clear again. The vehicle operator can easily use this device to clean the front windows of the vehicle.

Most vehicles also have rear-view mirrors designed to allow the driver to view rearward through the vehicle's rear window. Further, the vehicles have side-view or wing mirrors positioned on the exterior of the vehicles to enable the vehicle driver to view areas behind and to the sides of the vehicle which are outside the driver's peripheral vision. Unlike a windshield, it is difficult to clean the rear-view mirrors and side-view mirrors and people may lack proper equipment to clean these mirrors. While using the vehicles, dirt, grime, smears, and other debris are often left to gather on the mirrors. Dirty mirrors may block the rearward and side views of the vehicle operators. This is not only inconvenient, but also dangerous as the driver cannot see potential dangers while operating the vehicle.

Some people may use a cleaning cloth to clean the rear-view or side-view mirrors manually. However, a dry cloth may accidently scratch the mirror surface and a wet cloth will likely leave streaks. Additionally, some people may use a wiper or squeegee for cleaning the rear-view or side mirror. However, conventional wipers are typically large and may be difficult to use on small side mirrors. Also, conventional wipers fail to fit to the curvature of different types of mirror, thereby leaving the mirror surface dirty.

Therefore, there exists a long felt need in the art for a tool for cleaning rear-view mirrors and side-view mirrors conveniently. There is also a long felt need in the art for a cleaning tool which can be used for cleaning small mirrors or windows of the vehicles. Additionally, there is a long felt need in the art for a cleaning tool which can clean the rear-view mirrors and side-view mirrors without scratching the mirror surfaces. Moreover, there is a long felt need in the art for a mirror cleaning tool which adapts to the curvature of different mirrors while cleaning the mirrors or windows. Further, there is a long felt need in the art for a mirror or window cleaning tool which cleans the complete mirror or window surface without leaving any residual dirt. Finally, there is a long felt need in the art for a cleaning tool which offers a simple and convenient method to cleaning small mirrors with water.

In this manner, the novel curved mirror cleaning device of the present invention accomplishes all of the forgoing objectives, and provides a relatively easy, convenient and effective solution for cleaning rear-view mirrors and side-view mirrors of the vehicle. The vehicle mirror cleaning device of the present invention allows a user to clean and wipe smaller sized mirrors or windows without scratching the mirror surfaces. Additionally, the mirror cleaning device is adapted to the curvature of different mirrors and/or windows, thereby cleaning complete surface of the mirror and/or window and not leaving any dust, debris, dirt, or others over the mirror surface.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a mirror cleaning device. The mirror cleaning device is configured to clean a curved surface. The mirror cleaning device comprises a head, a cleaning blade, a connector, and a handle. The head comprises a connecting bar and a cleaning blade retaining rail. The connecting bar is arced or curved in shape.

The connecting bar comprises a handle attachment hole. The handle attachment hole is a through hole located midway between a pair of ends of the connecting bar. The handle comprises a head engaging end and a grip end. The head engaging end comprises a connector receiving hole. The connector penetrates the handle attachment hole and engages the connector receiving hole to attach the connecting bar to the handle. The connecting bar may extend perpendicularly from or in-line with the handle. The grip end of the handle may comprise a grip for a user to grasp the mirror cleaning device.

The connecting bar further comprises a pair of connecting members. The pair of connecting members extend from the connecting bar at opposite ends. The pair of connecting members may be fixedly or pivotally connected to the connecting bar. The pair of connecting members are configured to engage the cleaning blade rail thereby attaching the cleaning blade retaining rail to the connecting bar.

The cleaning blade retaining rail may be a squeegee blade retaining rail. The cleaning blade retaining rail comprises a groove and a pair of ends. The groove runs along a length of the cleaning blade retaining rail opposite the connecting bar. The groove is configured to retain the cleaning blade. The pair of connecting members of the connecting bar grip and retain the cleaning blade retaining rail adjacent to the pair of ends of the cleaning blade retaining rail.

The cleaning blade is flexible and configured to conform to and engage a curved surface. The cleaning blade is removable from the cleaning blade retaining rail. The cleaning blade may be a squeegee blade. In use on a curved surface, the cleaning blade will have two initial contact points the surface, allowing the cleaning blade to adapt to the curvature of almost any curved surface.

The head further comprises a pair of springs. Each of the pair of springs are attachable to the cleaning blade retaining rail adjacent to the pair of ends of the cleaning blade retaining rail. The pair of springs are configured to provide rotational support for the cleaning blade retaining rail. The pair of springs may be double coiled and are both wrapped around the cleaning blade retaining rail. The cleaning blade is then positional within in the groove of the cleaning blade retaining rail.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
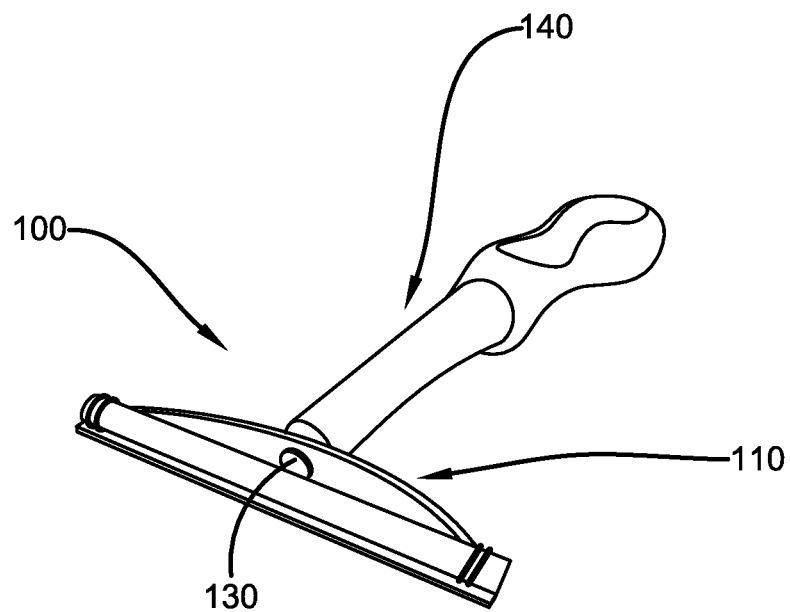
FIG. 1 illustrates a perspective view of one potential embodiment a mirror cleaning device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a tool for cleaning rear-view mirrors and side-view mirrors conveniently. There is also a long felt need in the art for a cleaning tool which can be used for cleaning small mirrors or windows of the vehicles. Additionally, there is a long felt need in the art for a cleaning tool which can clean the rear-view mirrors and side-view mirrors without scratching the mirror surfaces. Moreover, there is a long felt need in the art for a mirror cleaning tool which adapts to the curvature of different mirrors while cleaning the mirrors or windows. Further, there is a long felt need in the art for a mirror or window cleaning tool which cleans the complete mirror or window surface without leaving any dirt, dust, or other contaminants. Finally, there is a long felt need in the art for a cleaning tool which offers a simple and convenient method to cleaning small mirrors with water.

The subject matter disclosed and claimed herein, in one embodiment thereof, comprises a small hand cleaning tool designed to clean side or rear-view mirrors on a vehicle. The hand tool features a squeegee blade connected to an ergonomic handle for using the device for cleaning any smooth surface, such as a window or mirror. The squeegee blade is connected at two contact points to a connecting member, which is screwed to the handle, thereby enabling the squeegee blade to adapt to the curvature of almost any smooth surface. Additionally, with the set screw fastening mechanism, a user can easily remove the squeegee blade and replace it with a new squeegee blade in case the used squeegee blade is worn or damaged. The tool is adapted to clean side or rear view mirrors on a vehicle.

Figure 2:
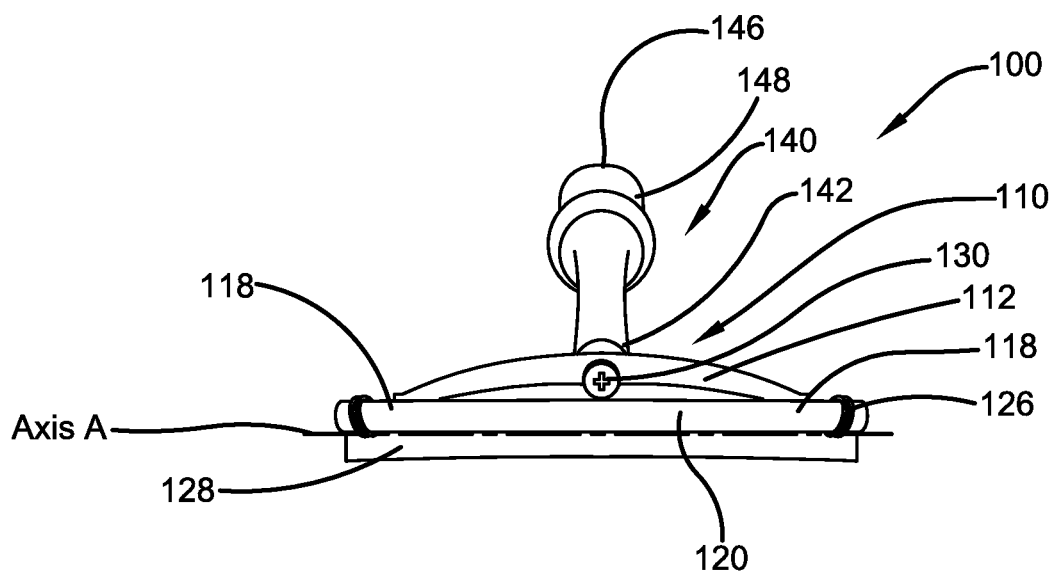
FIG. 2 illustrates a perspective view of the mirror cleaning device of the present invention in accordance with the disclosed architecture.
Figure 3:
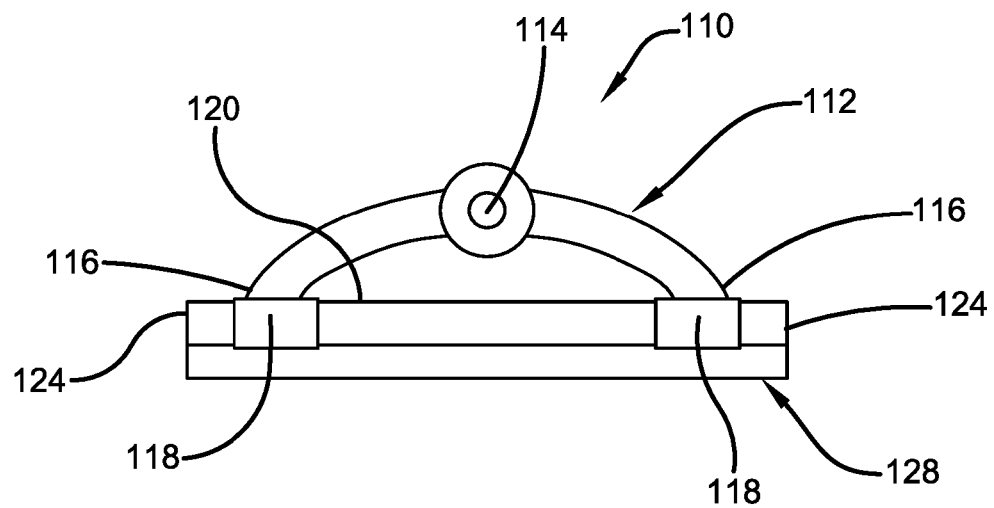
FIG. 3 illustrates a side view of the head of the cleaning device of the present invention in accordance with the disclosed architecture.
Figure 4:
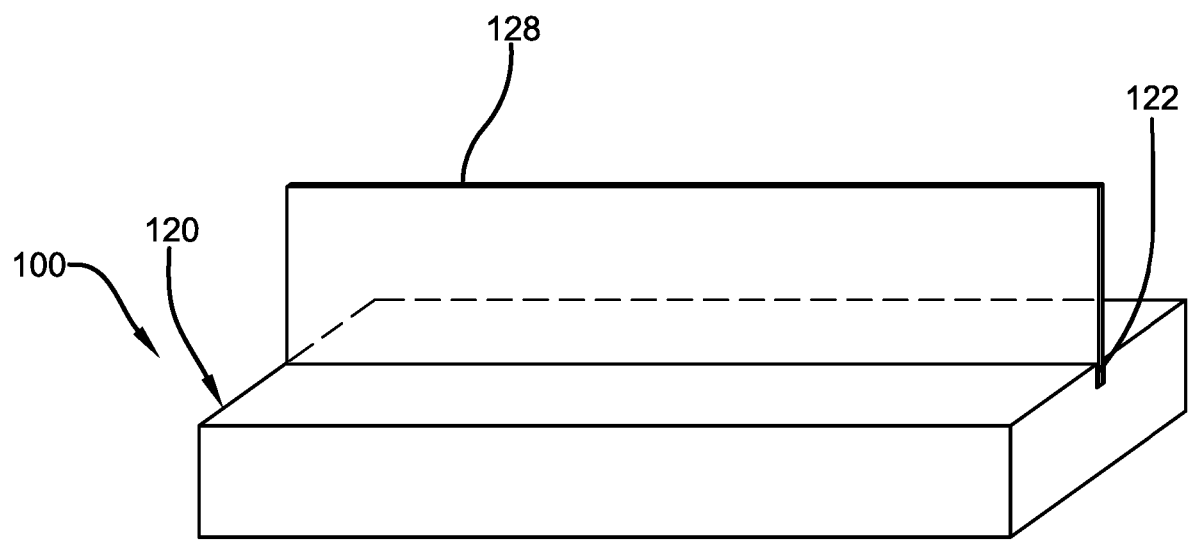
FIG. 4 illustrates an underneath perspective view of a squeegee retaining rail and a squeegee blade of the cleaning device of the present invention in accordance with the disclosed architecture.
Figure 5:
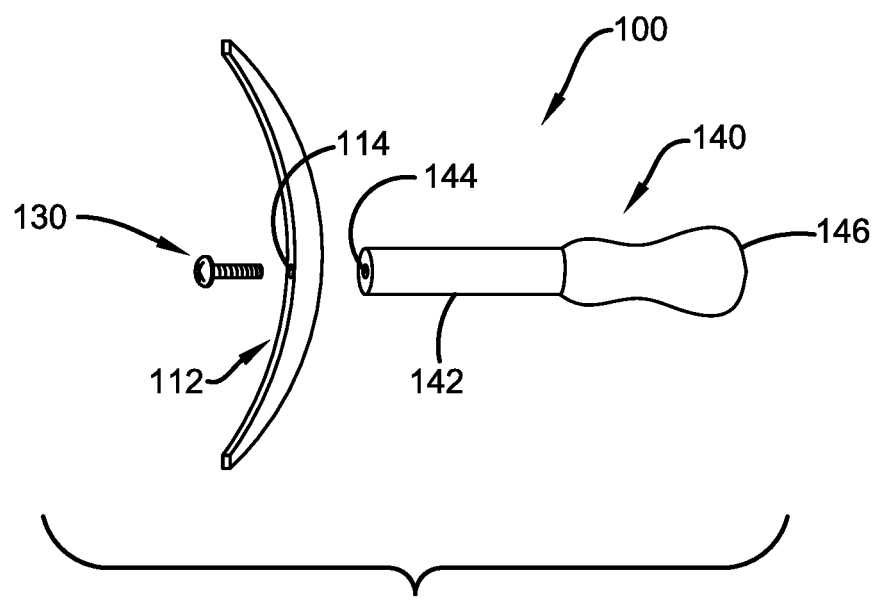
FIG. 5 illustrates an exploded view of a head of the cleaning device of the present invention attaching to a handle as per the disclosed structure.
Figure 6:
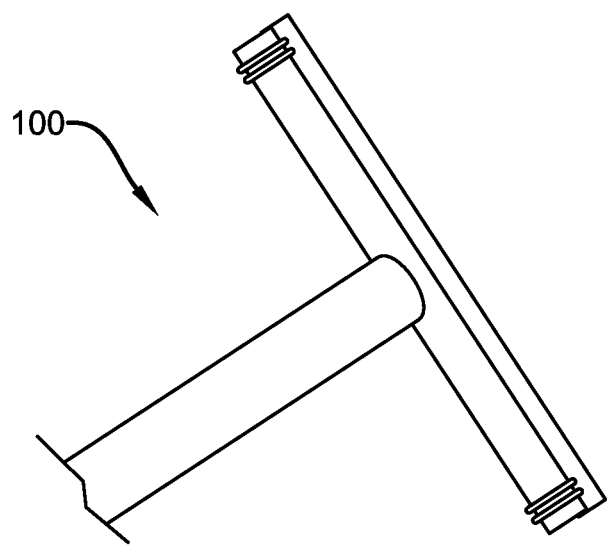
FIG. 6 illustrates a perspective view of the cleaning device of the present invention cleaning a mirror with a flat surface in accordance with the disclosed architecture.
Figure 7:
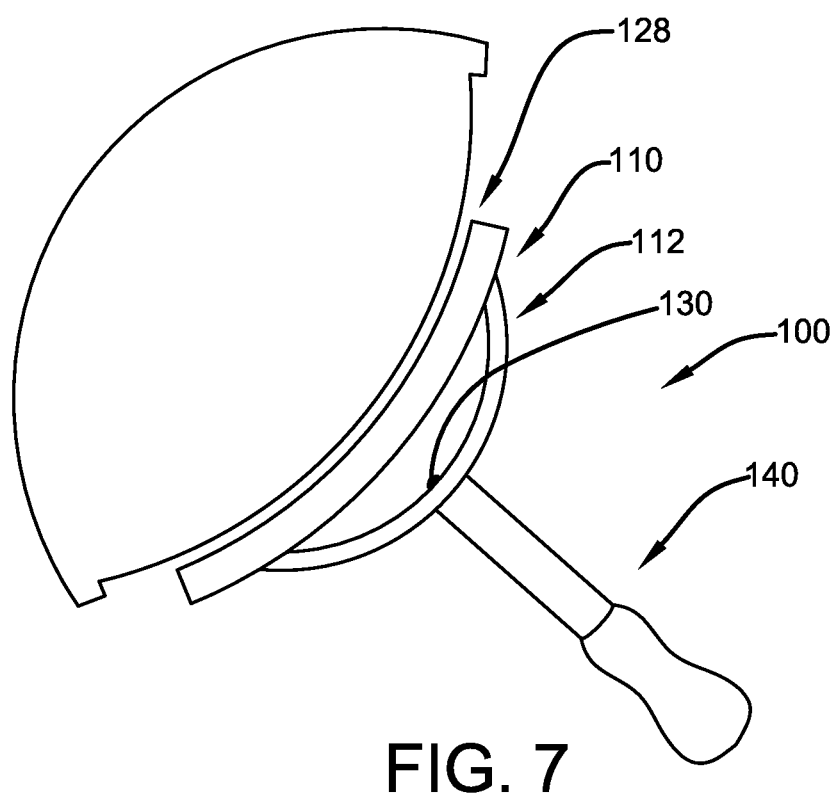
FIG. 7 illustrates a perspective view of the cleaning device of the present invention cleaning a mirror with a curved surface in accordance with the disclosed architecture.

Referring initially to the drawings, FIGS. 1-7 illustrate a mirror cleaning device 100. The mirror cleaning device 100 is configured to clean a curved surface as illustrated in FIGS. 6 and 7. As illustrated in FIG. 2, the mirror cleaning device 100 comprises a head 110, a cleaning blade 128, a connector 130, and a handle 140. As illustrated in FIGS. 2 and 3, the head 110 comprises a connecting bar 112 and a cleaning blade retaining rail 120. The connecting bar 112 is generally arced or curved in shape and may be flexible in construction.

As illustrated in FIGS. 3 and 4, the connecting bar 112 comprises a handle attachment hole 114. The handle attachment hole 114 is a through hole located approximately midway between a pair of ends 116 of the connecting bar 112. The handle attachment hole 114 may be threaded or unthreaded. As illustrated in FIGS. 2 and 5, the handle 140 comprises a head engaging end 142 and a grip end 146. The head engaging end 142 comprises a connector receiving hole 144. The connecting bar 112 may extend perpendicularly from or in-line with the handle 140. The grip end 146 of the handle may comprise a hand grip 148 ergonomically configured for a user to grasp the mirror cleaning device 100. The handle 140 may be of fixed length or may be telescoping to extend the length or the handle 140 as desired. The handle 140 may be hollow to hold replacement components for the mirror cleaning device 100. The handle 140 may also be configured to hold a refillable miniature spray bottle inside or extending out of the grip end 146.

To attach the head 110 to the handle 140, the connector 130 penetrates the handle attachment hole 114 and engages the connector receiving hole 144 to attach the connecting bar 112 to the handle 140. The connector 130 may be a threaded screw fastener, bolt, quick connect, or any other similar mechanical fastener. The handle 140 and the head 110 can be detached by releasing the connector 130.

The connecting bar 112 further comprises a pair of connecting members 118. The pair of connecting members 118 extend from the connecting bar 112 at opposite ends 116. The pair of connecting members 118 are typically be fixedly connected to the connecting bar 112. The pair of connecting members 118 are configured to engage the cleaning blade rail 120 thereby attaching the cleaning blade retaining rail 120 to the connecting bar 112. The pair of connecting members 118 may be generally u-shaped or of any shape and frictionally engage the cleaning blade retaining rail 120. Alternatively, the pair of connecting members 118 may be snap-fit connectors. The pair of connecting members 118 may also be pivotally connected to the connecting bar 112 allowing the cleaning blade rail 120 to be pivotally connected to the connecting bar 112.

The cleaning blade retaining rail 120 may be a squeegee blade retaining rail. The cleaning blade retaining rail 120 comprises a groove or blade channel 122 and a pair of ends 124. As illustrated in FIG. 4, the groove or blade channel 122 runs along a length of the cleaning blade retaining rail 120 opposite the connecting bar 112. The groove or blade channel 122 is configured to retain the cleaning blade 128. The pair of connecting members 118 of the connecting bar 112 grip and retain the cleaning blade retaining rail 120 adjacent to the pair of ends 124 of the cleaning blade retaining rail 120.

As illustrated in FIG. 7, the cleaning blade 128 is flexible and configured to conform to and engage a curved surface. The cleaning blade 128 is removable from the cleaning blade retaining rail 120. The cleaning blade 128 may be a squeegee blade. In use on a curved surface, the cleaning blade 128 will have two initial contact points the surface, allowing the cleaning blade to adapt to the curvature of almost any curved surface. The cleaning blade 128 physically contacts facial surface of a side-view mirror during use and has a smooth upward and downward movement. Alternatively, the cleaning blade 128 may be a microfiber pad giving the mirror cleaning device 100 absorptive properties. Alternatively, or in addition, the cleaning blade 128 may be suitable for scrubbing dirt from a surface. The cleaning liquid or water is removed from the mirror or window without leaving substantially any residue, and on the other hand the cleaning blade 128 protects the surface of the window/mirrors.

As illustrated in FIG. 2, the head 110 further comprises a pair of springs 126. The pair of springs 126 are attachable to the cleaning blade retaining rail 120 adjacent to the pair of ends 124 of the cleaning blade retaining rail 120. The pair of springs 126 are configured to provide rotational support for the cleaning blade retaining rail 120. The pair of springs 126 may be double coiled and are wrapped around the cleaning blade retaining rail 120. The cleaning blade 128 is then positioned in the groove 122 of the cleaning blade retaining rail 120.

The pair of springs 126 are similar in shape and structure passing around the cleaning blade retaining rail 120. The pair of springs 126 are configured to allow the cleaning blade retaining rail 120 to flex laterally with respect to a horizontal axis (axis A). The pair of springs 126 allow the cleaning blade retaining rail 120 to pivot along axis A up to thirty degrees in either direction allowing for even greater flexibility. The pair of springs 126 help control movement of the cleaning blade retaining rail 120 and helps in bringing the cleaning blade retaining rail 120 back to a straight orientation. The pair of springs 126 may be a torsional spring, a compression spring or a tension spring.

The pair of springs 126 may also be blade fastening wires that penetrate the body of cleaning blade 128 wrapping the cleaning blade retaining rail 120 to resemble a spring. The cleaning blade retaining rail 120 may be manufactured from either a flexible material to aid in flexing during use or a more rigid material to better imitate a windshield wiper.

Logos, Trademarks or any other design for branding and advertisement may be present at any surface of the handle 140 or connecting bar 112 to increase the aesthetic appeal of the mirror cleaning device 100. The mirror cleaning device 100 may come in various colors and can be sold as an accessory with vehicle mirrors. The ergonomic handle 140 may be made up of a polymeric material. Polymeric materials are particularly advantageous in connection with window and mirror wipers. The mirror cleaning device 100 is corrosion-resistant and easy to handle on account of its low weight and small size. In one embodiment, a hole at the rear side of the grip 148 may be present to hang the mirror cleaning device 100 on a wall mounted hook.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "cleaning tool", "hand tool", "mirror cleaning tool", "window cleaning tool", "T-shaped small wiper device", "small hand cleaning tool" and "mirror or window cleaning wiper" are interchangeable and refer to the mirror cleaning device 100 of the present invention.

Notwithstanding the forgoing, the mirror cleaning device 100 of the present invention can be of any suitable size and configuration as is known in the art without affecting the overall concept of the invention, provided that it accomplishes the above stated objectives. One of ordinary skill in the art will appreciate that the size, configuration and material of the mirror cleaning device 100 as shown in the FIGS. are for illustrative purposes only, and that many other sizes and shapes of the mirror cleaning device 100 are well within the scope of the present disclosure. Although the dimensions of the mirror cleaning device 100 are important design parameters for user convenience, the mirror cleaning device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mirror cleaning device comprising:
a head comprising a connecting bar comprising a pair of connecting members, and a squeegee blade retaining rail pivotally attachable to the connecting bar via the pair of connecting members; a first torsional spring attached to a first end of the squeegee blade retaining rail; and a second torsional spring attached to a second end of the squeegee blade retaining rail, the first and second torsional springs configured to provide rotational support to the squeegee blade retaining rail;
a squeegee blade retained by the squeegee blade retaining rail;
a connector: and
a handle attachable to the connecting bar of the head via the connector; and
wherein the handle is hollow and extendable in length.

2. The mirror cleaning device of claim 1, wherein the connecting bar is arced in shape.

3. The mirror cleaning device of claim 1, wherein the pair of connecting members are snap fit connectors.

4. The mirror cleaning device of claim 1, wherein the squeegee blade is configured to engage a curved surface.

5. The mirror cleaning device of claim 1, wherein the handle comprises a hand grip on one end and a connector receiving hole for accepting the connector on an opposing end.

6. A mirror cleaning device for cleaning a curved surface comprising:
a head comprising:
a connecting bar comprising a pair of connecting members;
a squeegee blade retaining rail comprising a groove; and
a pair of blade fastening wires attachable to the squeegee blade retaining rail adjacent to a pair of ends of the squeegee blade retaining rail, and wherein the squeegee blade retaining rail is attachable to the connecting bar via the pair of connecting members; and
a squeegee blade retained within the groove of the squeegee blade retaining rail;
a connector: and a handle attachable to the connecting bar of the head via the connector; and
wherein the handle comprises a connector receiving hole for accepting the connector; and
wherein the blade fastening wires penetrate the squeegee blade and wrap around the squeegee blade retaining rail; and
wherein the pair of blade fastening wires are configured to allow the cleaning blade retaining rail to pivot up to thirty degrees forward or backward.

* * * * *